United States Patent [19]

Caldwell

[11] 4,011,763

[45] Mar. 15, 1977

[54] SHAFT TURNING MECHANISM

[75] Inventor: Andrew H. Caldwell, Roanoke, Va.

[73] Assignee: General Electric Company, New York, N.Y.

[22] Filed: June 13, 1975

[21] Appl. No.: 586,770

[52] U.S. Cl. .............................................. 74/100 R
[51] Int. Cl.² .......................................... F16H 21/44
[58] Field of Search ................................ 74/100, 99

[56] References Cited

UNITED STATES PATENTS

| | | | |
|---|---|---|---|
| 1,725,606 | 8/1929 | Weatherhead | 74/100 |
| 2,109,615 | 3/1938 | Durham | 74/100 |
| 2,242,167 | 5/1941 | Bentley et al. | 74/100 |
| 2,463,659 | 3/1949 | Tiedeman | 74/100 |
| 2,694,757 | 11/1954 | Nickells | 74/100 |
| 2,886,974 | 5/1959 | Bauer | 74/100 |

*Primary Examiner*—Samuel Scott
*Assistant Examiner*—Weeley S. Ratliff, Jr.
*Attorney, Agent, or Firm*—Walter C. Bernkopf; James C. Beusse

[57] ABSTRACT

A linkage arrangement for connecting two parallel spaced shafts such that bilateral rotation of one shaft produces unilateral rotation of the other shaft. The linkage arrangement includes a substantially u-shaped member attached to one shaft and an elongated member attached to the other shaft and situated within the u-shaped member such that one leg of the u-shaped member will engage one end of the elongated member upon rotation of the u-shaped member in a first direction. Upon rotation of the u-shaped member in a second direction, the other leg of the u-shaped member will engage an opposite side and end of the elongated member such that the second shaft is caused to rotated in a unilateral direction.

3 Claims, 3 Drawing Figures

SHAFT TURNING MECHANISM

BACKGROUND OF THE INVENTION

This invention is related to shaft turning mechanisms and, more particularly, to a mechanism for converting bilateral oscillation to unilateral oscillation.

In some applications such as, for example, interconnection of potentiometer and switch shafts it is advantageous to provide rotation of the potentiometer shaft in one direction regardless of the direction of rotation of the switch shaft. In an electric vehicle control there is normally provided a rotatable switch having a shaft which rotates in one direction for forward motion of the vehicle and rotates in a second direction for reverse motion of the vehicle. The switch shaft is generally connected to the shaft of a speed control potentiometer. The amount of angular displacement of the potentiometer shaft determines speed or torque of the vehicle and the direction of displacement establishes the direction of travel of the vehicle. In the past it has been necessary to provide a potentiometer which is balanced against a center position such that equal angular rotation of the potentiometer shaft in either a forward or reverse direction produced equal proportions of resistance change since the potentiometer shaft followed the switch shaft. This further required an elaborate alignment procedure to initially set the potentiometer in the correct position and further required frequent realignment of the potentiometer.

Accordingly it is an object of the present invention to provide a mechanism for effecting unilateral rotation of one shaft in response to bilateral rotation of a second shaft.

In accordance with a preferred embodiment there is provided a substantially u-shaped linkage member mounted at a bight thereof to a first bilaterally oscillatable shaft, and a second elongated linkage arm mounted to a second shaft. The second arm is adjusted to lie at an angle between the legs of the u-shaped member whereby upon rotation of the first shaft in a first direction, one leg of the u-shaped member will engage a first end of the second arm to cause rotation of the second shaft in a first direction. Upon rotation of the first shaft in a second direction, the other leg of the u-shaped member will engage an opposite side of the second arm again causing rotation of the second shaft in the first direction.

For a better understanding of the present invention reference may be had to the illustrated embodiment in which FIG. 1 shows the substantially u-shaped member and the elongated linkage mounted on spaced shafts in a neutral position;

FIG. 2 shows the embodiment of FIG. 1 with counterclockwise rotation of the u-shaped member; and FIG. 3 shows the embodiment of FIG. 1 with clockwise rotation of the u-shaped member.

DETAILED DESCRIPTION

Figure 1:
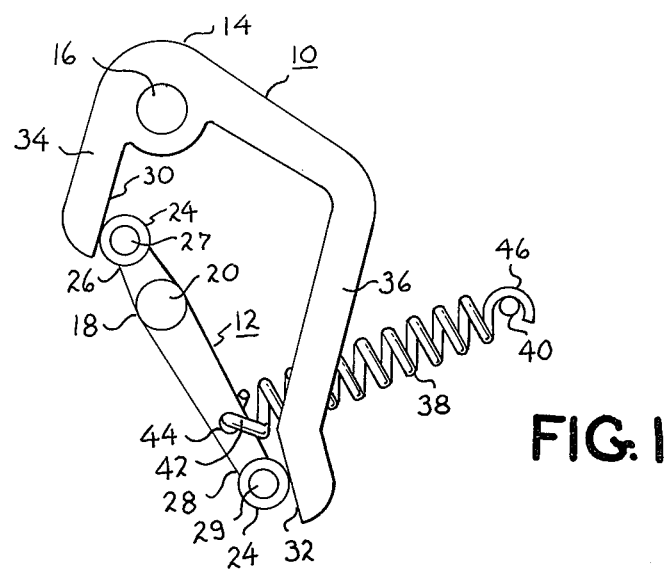
Figure 2:
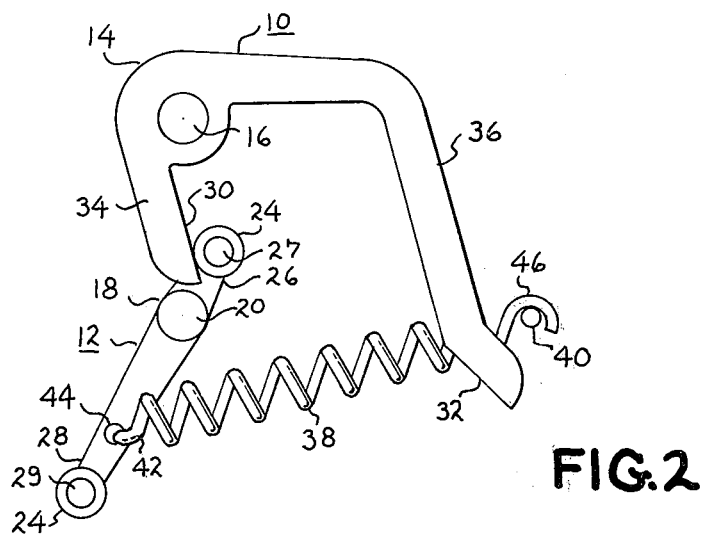

Referring now to FIG. 1 there is shown a preferred embodiment of the linkage arrangement of the present invention comprising a substantially u-shaped member 10 and an elongated link 12. Member 10 is attached at a bight 14 thereof to a rotatable shaft 16. Attachment may be by press-fit or by other means well known in the art. Link 12 is attached by means well known in the art at an intermediate point 18 to a rotatable shaft 20. Support means for shafts 16 and 20 have been omitted to effect clarity.

In order to reduce frictional wear between contact surfaces, rotatable means, herein shown as rollers 22 and 24, are attached to respective ends 26 and 28 of line 12 by means of pins 27 and 29. Rollers 22 and 24 provide rolling contact with inner surfaces 30 and 32 respectively of opposing legs 34 and 36 of member 10. A biasing means, herein shown as a helical spring 38, is attached to a first end 42 to link 12 and a second end 46 to pin 40, which pin is mounted on the support means (not shown). Spring 38 biases the ends of link 12, and more specifically rollers 22 and 24, against the inner surfaces 30 and 32 of member 10 and also acts as a return spring to return the mechanism to a neutral position when shaft 16 is released. In the embodiment of FIG. 1, spring 38 is attached to link 12 by passage of end section 42 through an opening 44 in link 12.

Figure 3:
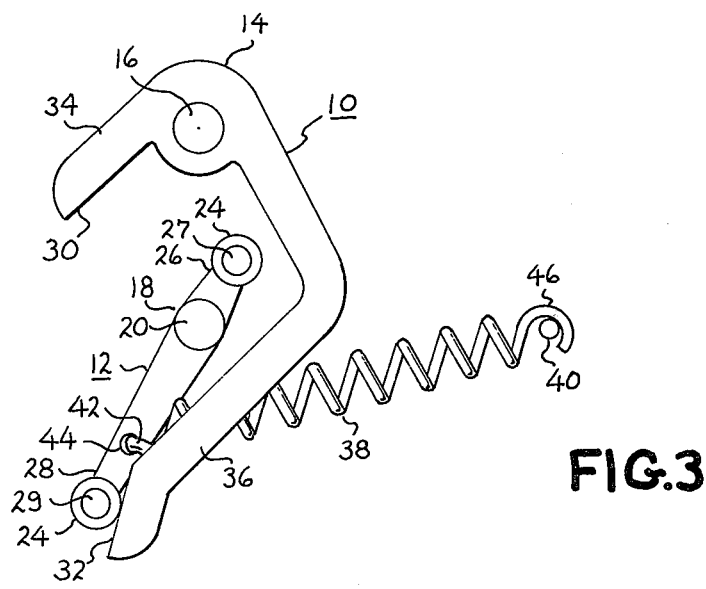

For a better understanding of the operation of the present invention, reference may be had to FIG. 3 in which counterclockwise rotation of shaft 16 is shown. As can be seen counterclockwise rotation of shaft 16 causes inner surface 30 of leg 34 to engage roller 22 thereby forcing link 12 and shaft 20 to rotate in a clockwise direction. As shaft 16 is returned to a neutral or starting position, spring 38 maintains roller 22 in contact with surface 30 whereby shaft 20 is returned to a neutral or starting position.

Referring to FIG. 3 there is shown operation of the linkage arrangement of the present invention in which shaft 16 is caused to rotate in a clockwise direction. With clockwise rotation of shaft 16, surface 32 of leg 36 engages roller 24 to force link 12 to rotate clockwise thereby rotating shaft 20 clockwise. Spring 38 forces roller 24 to maintain contact with surface 32 whereby shaft 20 will return to a neutral or starting position when shaft 16 is returned to a neutral position.

It can be seen from the above that the linkage arrangement of the present invention provides an efficient means for effecting unilateral rotation of one shaft in response to bilateral rotation of another shaft and further provides a means of amplifying rotation of one shaft with respect to rotation of the other by control of the dimensions of the linkage.

Amplified rotation of shaft 20 with respect to rotation of shaft 16 may be controlled by spacing between shaft 16 and 20 and by the length of link 12 and the lengths of legs 34 and 36 of member 10. In an embodiment wherein the distance from shaft 20 to roller 22 is ⅝ inch, the distance from shaft 20 to roller 24 is 1 inch and the distance between shaft 20 and shaft 16 is 1 inch, rotation of shaft 16 through 30° produced 60° of rotation of shaft 20. Obviously, by proper selection of linkage dimensions and shaft spacing, numerous relative rotations could be devised.

As will be evident from the foregoing description, certain aspects of the invention are not limited to the particular details of the example illustrated, and it is therefore contemplated that other modifications or applications will occur to those skilled in the art. It is therefore intended that the appended claims shall cover all such modifications and applications as do not depart from the true spirit and scope of the invention.

What is claimed and desired to be secured by letters patent of the United States is:

1. A linkage arrangement for converting rotation of a first shaft in either of two directions into unilateral rotation of a second shaft comprising:

a. a substantially u-shaped member attached at a bight thereof to said first shaft adapted to be rotated in either of two directions;

b. an elongated link attached at an intermediate point thereof to said second shaft, said linkage being engageable at the ends thereof with inner surfaces of opposing legs of said u-shaped member whereby bilateral rotation of said first shaft effects a unilateral rotation of said second shaft; and c. biasing means connected to said link for urging the ends thereof into contact with said legs of said u-shaped member.

2. The arrangement as defined in claim 1 and including rotatable means attached to each end of said link for providing rolling contact with said u-shaped member.

3. The arrangement as defined in claim 1 wherein the length of each of said legs of said u-shaped member and the position of said intermediate point on said link are proportioned to effect 60° of rotation of said second shaft for 30° rotation of said first shaft.

* * * * *